US008478045B2

(12) United States Patent
Sun et al.

(10) Patent No.: US 8,478,045 B2
(45) Date of Patent: Jul. 2, 2013

(54) METHOD AND APPARATUS FOR PROCESSING AN IMAGE COMPRISING CHARACTERS

(75) Inventors: Jun Sun, Beijing (CN); Hao Yu, Beijing (CN); Satoshi Naoi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 13/156,688

(22) Filed: Jun. 9, 2011

(65) Prior Publication Data

US 2012/0063687 A1 Mar. 15, 2012

(30) Foreign Application Priority Data

Sep. 9, 2010 (CN) .......................... 2010 1 0280256

(51) Int. Cl.
*G06K 9/00* (2006.01)
(52) U.S. Cl.
USPC .......................................... 382/181; 345/467
(58) Field of Classification Search
None
See application file for complete search history.

(56) References Cited

U.S. PATENT DOCUMENTS

| | | | | | |
|---|---|---|---|---|---|
| 3,182,290 | A | * | 5/1965 | Rabinow | 382/227 |
| 5,303,311 | A | * | 4/1994 | Epting et al. | 382/197 |
| 5,321,773 | A | * | 6/1994 | Kopec et al. | 382/209 |
| 5,379,349 | A | * | 1/1995 | Avi-Itzhak | 382/160 |
| 5,530,775 | A | * | 6/1996 | Avi-Itzhak | 382/209 |
| 5,675,665 | A | * | 10/1997 | Lyon | 382/229 |
| 5,812,697 | A | * | 9/1998 | Sakai et al. | 382/186 |
| 5,835,638 | A | * | 11/1998 | Rucklidge et al. | 382/257 |
| 6,035,061 | A | * | 3/2000 | Katsuyama et al. | 382/177 |
| 6,125,206 | A | * | 9/2000 | Yokota et al. | 382/189 |
| 6,643,401 | B1 | * | 11/2003 | Kashioka et al. | 382/197 |
| 6,724,936 | B1 | * | 4/2004 | Riemer | 382/186 |
| 7,120,297 | B2 | * | 10/2006 | Simard et al. | 382/166 |
| 7,227,993 | B2 | * | 6/2007 | Xu et al. | 382/179 |
| 7,376,266 | B2 | * | 5/2008 | Simard et al. | 382/166 |
| 7,382,921 | B2 | * | 6/2008 | Lossev et al. | 382/187 |
| 7,508,380 | B2 | * | 3/2009 | Chung | 345/171 |

OTHER PUBLICATIONS

"Modified Quadratic Discriminant Functions and the Application to Chinese Character Recognition" (IEEE Transactions on Pattern Analysis and Machine Intelligence, vol. PAMI-9, No. 1, 1987).
Anil K. Jain, "Data Clustering: 50 Years Beyond K-Means[1] ", Proceedings of the 19th International Conference on Pattern Recognition (ICPR), 2008, 33 pages.

* cited by examiner

*Primary Examiner* — Manav Seth
(74) *Attorney, Agent, or Firm* — Staas & Halsey LLP (57) ABSTRACT

Method and apparatus for processing an image including a character are disclosed. The method may include: searching in a set of characters one or more characters having highest similarities of shape to a character in the set of characters, hereinafter the character being referred to as a first character, the one or more searched characters forming a similar character list of the first character; searching in the set of characters one or more characters having highest similarities of shape to each character in the similar character list of the first character, to form a similar character list of each character in the similar character list of the first character; and selecting in the similar character lists one or more characters having a high mutual similarity between each other, as a character cluster.

14 Claims, 4 Drawing Sheets

METHOD AND APPARATUS FOR PROCESSING AN IMAGE COMPRISING CHARACTERS

CROSS REFERENCE TO RELATED APPLICATIONS

This application claims the benefit of Chinese Application 201010280256.4, filed Sep. 9, 2010, the disclosure of which is incorporated herein by reference.

TECHNICAL FIELD

The present disclosure relates to the field of character image processing, and more particularly, to a method and apparatus for processing an image including characters.

BACKGROUND

In a character set, there may be many characters similar to each other. For example, in Kanji character set and Korean character set, there are the following similar characters:

姶 始 拾 蛤 柗 給 (1)

갇 갂 갈 갏 갑 (2)

The above two character groups (1) and (2) each may be used as a character class in the corresponding character sets, respectively. A character set may be classified into a plurality of classes by a coarse classification, thus when recognizing a character, a class to which the character belongs may be determined first and then the character may be compared with each character in the class. This may significantly reduce the recognition time of characters, and thus improve the efficiency of character recognition. Therefore, the above coarse classification is very important. However, error coarse classification may result in mistakes in character recognition.

There are many clustering methods that can be applied to the above coarse classification. Among them, K-means is a method commonly used. For the description of K-means method, reference may be made to the following document: "*Data clustering: 50 years beyond K-means*" by A. K. Jain (Proceedings of the 19th International Conference on Pattern Recognition (ICPR), 2008). In K-means method, an initial center of each of K classes is determined first, and each sample is allocated to one of the K classes based on the minimum distance principle, then the average value of all the samples in each class is calculated and set as the new center of the class. The above steps are repeated, until all the samples are classified into K classes.

SUMMARY

Some embodiments of the present disclosure provide methods and apparatus for detecting a target in an image or video.

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an embodiment of the disclosure, one or more characters having highest similarities of shape to a character (hereinafter the character is referred to as a first character for clarity and conciseness) may be searched in the set of characters, the one or more searched characters forms a similar character list of the first character. Then one or more characters having highest similarities of shape to each character in the similar character list of the first character may be searched in the set of characters, to form a similar character list for each character in the similar character list of the first character. Then one or more characters having a high mutual similarity between each other in these similar character lists may be selected as a character cluster.

BRIEF DESCRIPTION OF THE DRAWINGS

The above and other objects, features and advantages of the embodiments of the disclosure can be better understood with reference to the description given below in conjunction with the accompanying drawings, throughout which identical or like components are denoted by identical or like reference signs. It should be noted that the components shown in the drawings are illustrated in a simplified manner, rather than being plotted in proportion. In the drawings.

DESCRIPTION OF EMBODIMENTS

The embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that only device structures and/or processing steps closely relevant to the solutions of the disclosure will be illustrated in the drawings while omitting other details less relevant to the disclosure or well known in the art for the sake of clarity and conciseness.

The inventor of the disclosure noted that, some clustering methods (e.g. the K-means clustering method) need to predefine the number of clusters (e.g. the value of K) into which the character set is to be divided, but fail to provide the criterion of determining the number (e.g. K). Furthermore, the distance measures employed in the clustering methods (e.g. the K-means clustering method) are generally irrelevant to the similarity measures to be used in the following character recognition and processing. For example, in some clustering methods the Euclidean distance between two elements are utilized to find the nearest neighbor of each element, while in the following character recognition or classification (e.g. by using Modified Quadratic Discriminant Function (MQDF) or Support Vector Machine (SVM)) the affects of multiple classes are generally takes into consideration to calculate the distance. Accordingly, the characters contained in each character class obtained by coarse classification using these clustering methods may be considered as dissimilar to each other in the following character recognition or classification.

Some embodiments of the disclosure provide methods and apparatus for processing an image including a character, to overcome one or more of the above defects.

Figure 1:
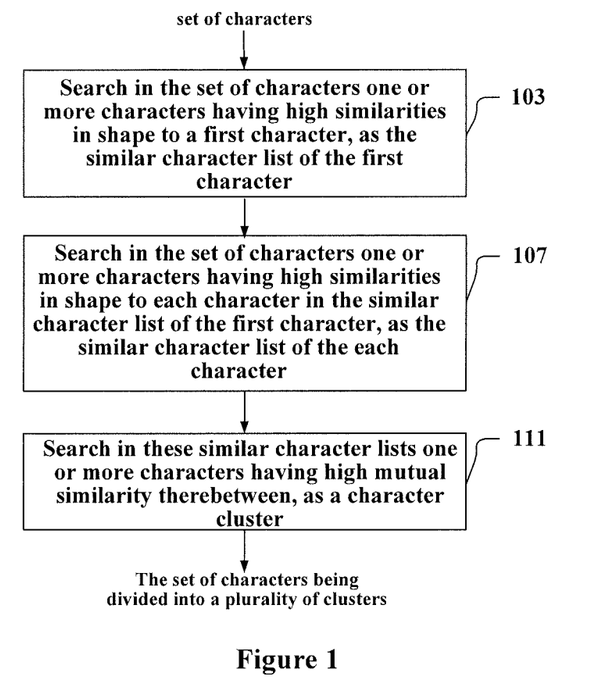
FIG. 1 is a schematic flow chart illustrating a method for processing an image including a character according to an embodiment of the disclosure.

FIG. 1 is a schematic flow chart illustrating a method for processing an image including a character according to an embodiment of the disclosure, by which the characters in a character set may be divided into a plurality of compact character clusters.

The method as shown in FIG. 1 may include steps 103, 107 and 111.

In step 103, for a character (hereinafter the character is referred to as the first character) in a set of characters (i.e. a character set), one or more characters having highest similarities of shape to the first character is searched in the character set. The one or more characters thus searched forms a similar character list of the first character.

In the disclosure, the so called similarity of a character or its image sample to another character refers to the degree of resemblance in appearance between the two characters. For example, the characters in the above mentioned character group (1) or (2) are similar to each other in shape. The similarity may be represented by any appropriate measure. For example, the similarity between two characters may be represented by the distance (e.g. the Euclid distance, or the Mahalanobis Distance, or the like) between the two characters. The smaller the distance, the higher the similarity is, and the larger the distance, the lower the similarity is.

The characters having high similarities of shape to the first character may be searched by using any appropriate method. For example, one image sample of the first character may be used, and the characters having high similarities of shape to the image sample in the character set may be searched and utilized as the similar characters of the first character, to form the similar character list of the first character. In another example, multiple of image samples of the first character may be used to search the similar characters of the first character, the particular examples of the method may be found in the following description with reference to FIG. 2 or FIG. 3.

The characters having high similarities of shape to an image sample may be searched by using any appropriate method, the particular examples of which may be found in the following description with reference to FIG. 4 or FIG. 5.

As an example, the number of characters in a similar character list needs not to be predefined. For example, a similarity threshold may be set and each character having a similarity to the first character larger than the threshold may be used as one element of the similar character list of the first character. As another example, the number (e.g. represented by N, $N \geq 1$) of characters in a similar character list may be predefined according to the actual application scenario and N characters having the highest similarities to the first character are selected to form the similar character list of the first character.

After obtaining the similar character list of the first character, the same processing is performed to each character in the similar character list in step 107. That is, in step 107 one or more characters having highest similarities of shape to each character in the similar character list of the first character are searched in the character set, to form a similar character list for each character in the similar character list of the first character. Since the similar character list of the first character contains one or more characters, one or more similar character lists may be obtained, each of the similar character lists corresponds to one character in the list.

Then, in step 111 the characters in these similar character lists are further selected, that is, one or more characters having high mutual similarity between each other are selected in these similar character lists and the selected characters are used as a character cluster of the character set.

The characters in these similar character lists may be further selected by using any appropriate method that can guarantee that any two of the characters in the character cluster have mutual similarity in shape therebetween.

As an example, characters having mutual similarity no smaller than a threshold in these similar character lists may be selected, i.e. the similarity between any two of the characters in the formed character cluster is no smaller than the threshold (this threshold may be determined according to the actual application scenario and is not limited any particular value).

As another example, a graph model based on Maximum Clique may be used to find the characters having a mutual similarity in shape in these similar character lists. A particular example of forming the character cluster by using the Maximum Clique-based graph model is described below with reference to FIG. 6.

As a preferred example, one of any two characters in the character cluster is included in the other's similar character list.

With the above method, the character set may be divided into multiple of character clusters.

In the method as shown in FIG. 1, after forming the similar character list of the first character, the similar character list of each character in the first character's similar character list is further searched, and the characters in these similar character lists are further selected to form a character cluster. With this method, any two characters in the character cluster may be guaranteed to have high mutual similarity in shape, thereby ensuring the compactness and accuracy of the clustering. Furthermore, in the method the number of character clusters needs not to be preset, that is, it is not necessary to predefine how many clusters the character set will be divided into. By using the character clusters thus formed, the accuracy and efficiency of the following character recognition and processing may be improved.

In the example using the Maximum Clique-based graph model, the number of characters in each character cluster may be assured to be maximum, thereby reducing the number of character clusters and thus maximizing the efficiency of the following processing.

Figure 2:
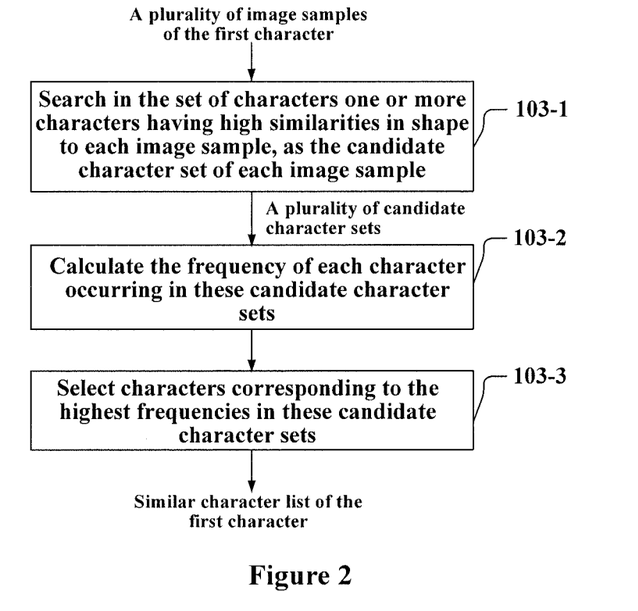
FIG. 2 is a schematic flow chart illustrating a method of searching a similar character list for a character in a character set according to a particular embodiment.

FIG. 2 illustrates a particular embodiment of a method of searching the similar character list of a character (e.g. the first character) in a character set. In the particular embodiment as shown in FIG. 2, the method of searching the similar character list of the first character may include steps 103-1, 103-2 and 103-3. In step 103-1, for each of a plurality of image samples of the first character, one or more characters having highest similarities in shape to the each image sample are searched in the character set, the searched one or more characters forms the candidate character set of the each image sample. The candidate character set of the image samples may be searched by using any appropriate method, some examples of which are described below with reference to FIG. 4 and FIG. 5. A plurality of candidate character sets may be obtained, each candidate character set corresponds to one of the plurality of image samples of the first character. Then in step 103-2, the frequency of each character occurring in these candidate character sets is calculated, and in step 103-3, one or more characters corresponding to the highest frequencies are selected as the similar characters of the first character, these similar characters forms the similar character list of the first character.

Figure 3:
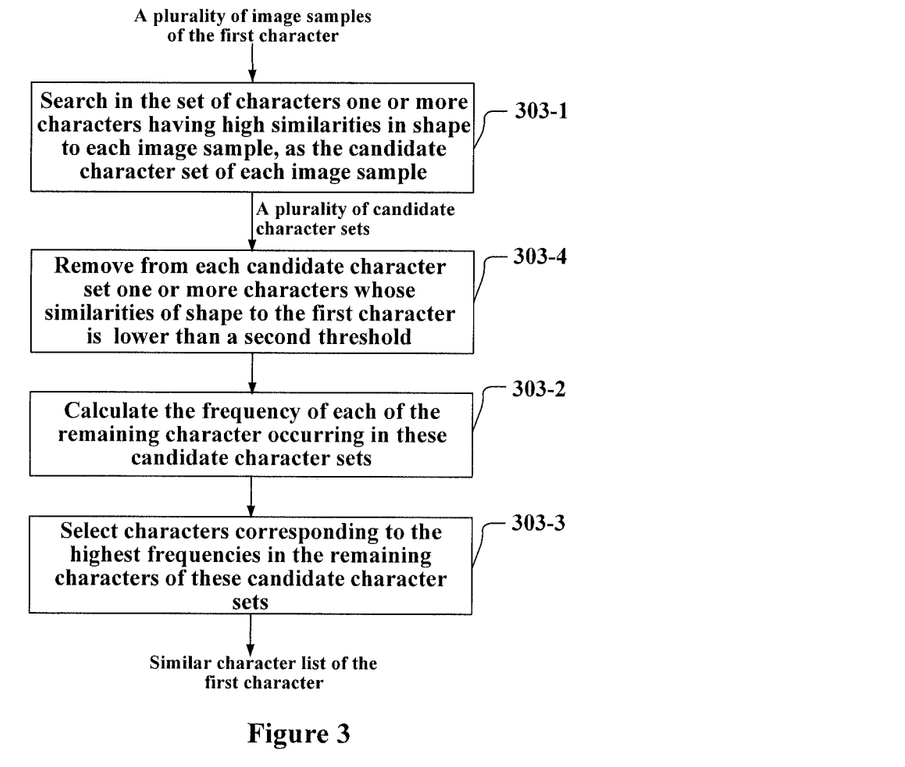
FIG. 3 is a schematic flow chart illustrating a method of searching a similar character list for a character in a character set according to another particular embodiment.

FIG. 3 illustrates another particular embodiment of a method for searching the similar character list of a character (e.g. the first character) in a character set. The particular embodiment as shown in FIG. 3 is similar to that of FIG. 2. The differences lie in that the method of FIG. 3 further includes a step of initially selecting the characters in the candidate character sets. Particularly, the method of searching the similar character list of the first character as shown in FIG. 3 may include steps 303-1, 303-4, 303-2 and 303-3. Step 303-1 is similar to step 103-1, the description of which is not repeated herein. In step 303-4, one or more characters, the shape similarities of which to the first character are smaller than a threshold, are removed from each candidate character set. In other words, it is judged whether the similarity in shape of each character in the candidate character sets to the first character is smaller than a threshold, if yes, the character is removed, and otherwise, the character is reserved. As can be appreciated, the threshold herein may be determined according to actual application scenario and should not be limited to any particular value. Then in step 303-2, the frequency of each of the remaining characters occurring in the candidate character sets is calculated. Finally In step 303-3, one or more characters corresponding to the highest frequencies are selected to form the similar character list of the first character. Compared with the method as shown in FIG. 2, the computing amount of the method of FIG. 3 is reduced, thereby accelerating the processing speed.

Figure 4:
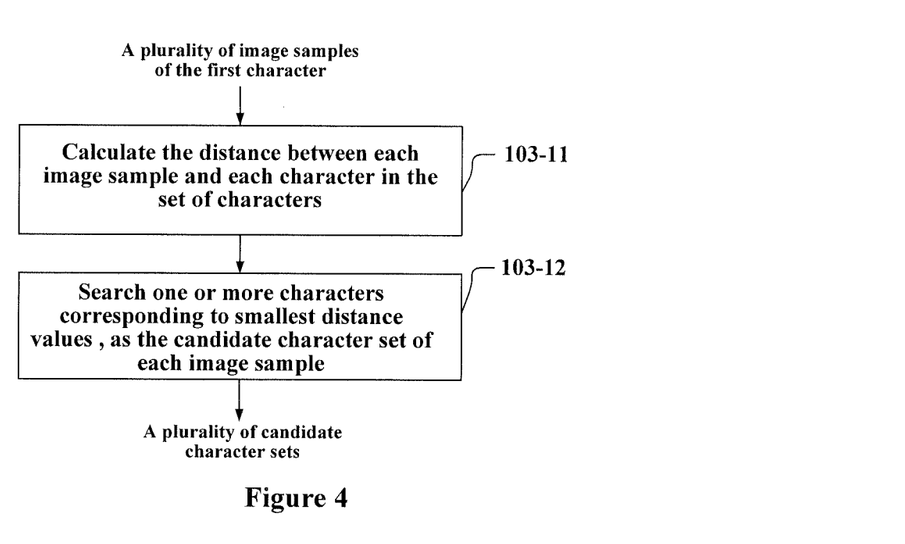
FIG. 4 is a schematic flow chart illustrating a method of searching a candidate character set for an image sample of a character in a character set according to a particular embodiment.

FIG. 4 illustrates an example of searching in a character set characters having high similarity in shape to an image sample (e.g. an image sample of the first character). The method as shown in FIG. 4 may include steps 103-11 and 103-12. In step 103-11, the distance between the image sample and each character in the character set is calculated. The distance may by calculated by any appropriate method, such as the method described in "*Modified Quadratic Discriminant Functions and the Application to Chinese Character Recognition*" (IEEE Transactions on Pattern Analysis and Machine Intelligence, vol. PAMI-9, No. 1, 1987) or the like, which should not be limited to any particular example. The smaller the distance between the image sample and a character, the more similar to each other they are. In step 103-12, based on the calculated distance values, one or more characters corresponding to smaller distance values are selected, as the characters having highest similarities in shape to the image sample. The one or more selected characters constitute the candidate character set of the image sample. In case there are a plurality of image samples of the same character, a plurality of candidate character sets may be searched by using the method of FIG. 4, each of which corresponds to one of the image samples.

As an example, the similarity in shape between a character and an image sample may be calculated by the same measure to be utilized in the following character recognition, so that the character clusters thus formed better suit the following character recognition process, thereby improving the accuracy of the character recognition and processing.

Figure 5:
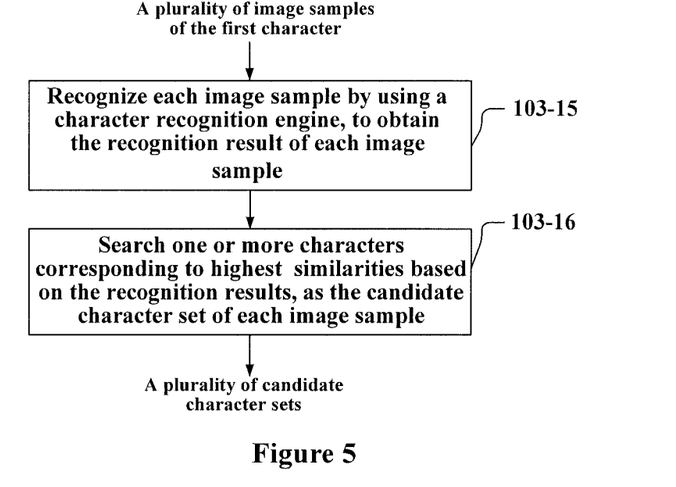
FIG. 5 is a schematic flow chart illustrating a method of searching a candidate character set for an image sample of a character in a character set according to another particular embodiment.

FIG. 5 illustrates another example of searching in a character set characters having high similarity in shape to an image sample (e.g. an image sample of the first character). The method as shown in FIG. 5 may include steps 103-15 and 103-16.

In step 103-15, a character recognition engine is utilized to recognize the image sample, to obtain the recognition result of the image sample. The recognition result generally includes one or more characters that are recognized by the engine as being most similar to the image sample and the similarity value between each of these characters and the image sample. In this example, the recognition may be performed by any appropriate recognition engine, which should not be limited any particular engine. As a preferred example, a recognition engine which is the same with that of the following character recognition may be used. Since the same recognition engine utilizes the same measure of similarity, this may further improve the accuracy and efficiency of the following character recognition and processing.

In step 103-16, based on the recognition result, one or more characters corresponding to the largest similarity values are selected among the characters obtained by the recognition engine, to form the candidate character set of the image sample. In case there are a plurality of image samples of the same character, a plurality of candidate character sets may be searched by using the method of FIG. 5, each of which corresponds to one of the image samples.

Hereinafter a particular example of dividing a Korean character set into character clusters is described.

For conciseness, only the process of forming one character cluster containing the character "가" (which is represented by "ch1" in FIG. 6) is described as an example. In this example, a plurality of image samples of the character "가" may be used.

Firstly, each image sample may be recognized by an Optical Character Recognition (OCR) engine, using the method described with reference to FIG. 5.

The recognition result obtained by the OCR engine for each image sample may include N candidate characters and the similarity values in shape between these characters and the image sample.

In this example, it is supposed that N=10 and the recognition distance obtained by the OCR engine is employed to represent the similarity in shape between each candidate character and the image sample. The longer the recognition distance between a candidate character and the image sample, the lower the similarity value between them is; and the shorter the recognition distance, the higher the similarity value between them is.

Table 1 shows the recognition results obtained by an OCR engine for three image samples of the character "가".

TABLE 1

| | Recognition result of sample 1 | | | Recognition result of sample 2 | | | Recognition result of sample 3 | | |
|---|---|---|---|---|---|---|---|---|---|
| | Character | UTF-8 Code | Recognition distance | Character | UTF-8 Code | Recognition distance | Character | UTF-8 Code | Recognition distance |
| Candidate character 1 | 가 | B0A1 | 0645 | 가 | B0A1 | 0575 | 가 | B0A1 | 0624 |

TABLE 1-continued

|  | Recognition result of sample 1 | | | Recognition result of sample 2 | | | Recognition result of sample 3 | | |
| --- | --- | --- | --- | --- | --- | --- | --- | --- | --- |
|  | Character | UTF-8 Code | Recognition distance | Character | UTF-8 Code | Recognition distance | Character | UTF-8 Code | Recognition distance |
| Candidate character 2 | 기 | B1E2 | 0917 | 기 | B1E2 | 0793 | 기 | B1E2 | 0914 |
| Candidate character 3 | 가 | B0BC | 0986 | 자 | C0DA | 0953 | 가 | B0BC | 1015 |
| Candidate character 4 | 차 | C2F7 | 1023 | 카 | C4AB | 0957 | 자 | C0DA | 1026 |
| Candidate character 5 | 자 | C0DA | 1043 | 차 | C2F7 | 0985 | 차 | C2F7 | 1068 |
| Candidate character 6 | 카 | C4AB | 1055 | 가 | B0BC | 1018 | 가 | B0A1 | 1118 |
| Candidate character 7 | 마 | B8B6 | 1061 | 기 | B0C5 | 1028 | 마 | B8B6 | 1130 |
| Candidate character 8 | 거 | B0C5 | 1102 | 마 | B8B6 | 1059 | 거 | B0C5 | 1135 |
| Candidate character 9 | 카 | C4AB | 1139 | 가 | B0A1 | 1085 | 카 | C4AB | 1144 |
| Candidate character 10 | 가 | B0A1 | 1151 | 카 | C4AB | 1097 | 카 | C4AB | 1186 |

After obtaining the three candidate character sets shown in the above table, the characters in them are further selected. First, one or more characters having lower similarities in shape to each sample may be removed from the candidate character set of the sample. For example, judgment may be made on whether the recognition distance corresponding to each candidate character is larger than a threshold TH, and if yes, the character is removed. In this example the threshold TH is set to 1000. However, it should be appreciated that the threshold TH is determined according to actual application scenarios, and the disclosure should not be limited to this particular value employed in this example.

Then the frequency of each of the remaining candidate characters occurring the three candidate character sets is calculated, and characters corresponding to frequencies larger than a frequency threshold (represented by T_freq) are selected, to form the similar character list of the character "가". The threshold value T_freq may be determined according to actual application scenarios, and should not be limited to any particular values. As a preferred example, T_freq may be set as proportional to the frequency of the character corresponding to the second largest frequency (the frequency of the character corresponding to the largest frequency is not used since this character with the largest frequency is usually the first character itself (i.e. "가" in this example)). For example, the character corresponding to the second largest frequency in the above table 1 is "기", and T_freq may be set as half of the frequency of the character "기" occurring in table 1.

After the above processing, the similar character list of the character ch1 is obtained, which includes the following:

가 (b0a1):기 (b1e2) 카 (c4ab) 가 (b0bc) 거 (b0c5)  (3)

The same processing is performed to each similar character in the above list (3), to obtain the similar character lists of all the similar characters in the list (3):

기 (b1e2):거 (b0c5) 캐 (c4bf) 가 (b0a1) 쇠 (c5b0)  (4)

카 (c4ab):쇠 (c5b0) 캐 (c4bc) 캐 (c4bf) 가 (b0a1) 기 (b1e2)  (5)

가 (b0bc):가 (b0a1) 캐 (c4bc) 기 (b1e2) 카 (c4ab)  (6)

거 (b0c5):기 (b1e2) 캐 (c4bf) 가 (b0a1) 쇠 (c5b0)  (7)

The lengths of the above lists (i.e. the number of characters in each list) are not equal to each other. A character included in one similar character list may be excluded in another similar character list. For example, "카 (c4bc)" is similar to "카 (c4ab)", but is not similar to "가 (b0a1)".

Figure 6:
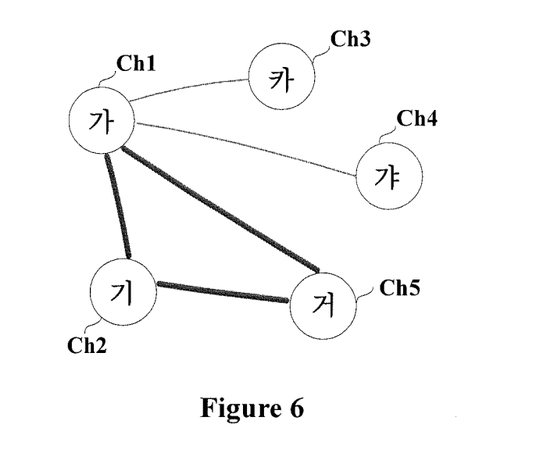
FIG. 6 is a diagram illustrating a character cluster created according to an example.

Then a character cluster may be constituted by using the Maximum Clique-based graph model. In other words, since any two of the characters in the character cluster to be constituted are required to be sufficient similar to each other, constituting such character cluster may be simplified as searching the maximum clique among the above lists. FIG. 6 shows a graph model established based on the above lists (3)-(7) for the character "가 (b0a1)". In the graph of FIG. 6, each vertex (ch1-ch5) corresponds to one character in the similar character list (3). If two vertexes are connected by an edge (a line segment), the characters corresponding to the two vertexes are similar to each other, that is, either one of the two characters is included in the similar character list of the other one of the two characters. For example, ch2 is present in the similar character list (7) of ch5, and ch5 is present in the similar character list (4) of ch2, and therefore the two corresponding vertexes are connected. In FIG. 6, ch1, ch2, and ch5 are mutually connected, that is either one of any two of the three characters is included in the similar character list of the other of the any two. Accordingly, the three characters may constitute a character cluster. In the graph model of FIG. 6, only the vertexes with mutual similarity are connected, thus the similarity between two characters may employ asymmetric measures.

In the above cluster forming method based on maximum clique, the inner structure of the similar character lists are utilized effectively, and the cluster thus formed is compact. By using the method, it is not necessary to predefine the number of clusters. The computation operations of the method are simple, thereby further improving the efficiency and speed of the processing.

Table 2 shows the number of character classes obtained by classifying a Kanji character set and a Korean character set without applying the above method described with reference to FIG. 6 and the number of character clusters obtained by dividing the same sets using the above method of FIG. 6:

TABLE 2

| | Number of character classes obtained without applying the above method | Number of character clusters obtained by applying the above method |
|---|---|---|
| Kanji (level 1) | 2965 | 2093 |
| Korean | 2350 | 1185 |

As can be seen, the number of clusters obtained by using the method of FIG. 6 is reduced from 5315 to 3278. By using the character clusters, the number of character classes in a character set may be reduced, thereby improving the speed and efficiency of the following character recognition processing.

In the above Table 1 and the lists (3)-(7), each character is assigned a UTF-8 code for the sake of clarity. It shall be appreciated that these characters may be represented by other types of codes in actual applications and the example should not be construed as limiting the disclosure to it.

Figure 7:
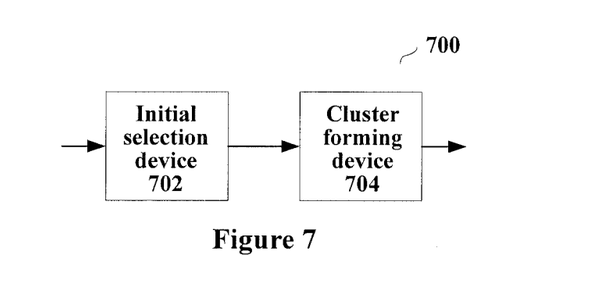
FIG. 7 is a schematic block diagram illustrating an apparatus for processing an image including a character according to an embodiment of the disclosure.

FIG. 7 is a schematic block diagram showing the structure of an apparatus 700 for processing an image containing a character according to an embodiment of the disclosure. The apparatus 700 may employ the methods of the above embodiments or examples to divide a set of characters (i.e. a character set) into a plurality of character clusters.

The apparatus 700 as shown in FIG. 7 may include an initial selection device 702 and a cluster forming device 704.

The initial selection device 702 is configured to search in a character set one or more characters having highest similarities of shape to a character (referred to as the first character) in the character set, the one or more searched characters constitute a similar character list of the first character. Then the initial selection device 702 performs the same processing to each character in the similar character list of the first character. In other words, the initial selection device 702 is further configured to search in the character set one or more characters having highest similarities of shape to each character in the similar character list of the first character, as the similar character list of each character in the similar character list of the first character.

The initial selection device 702 may employ any appropriate method of searching characters having high similarities of shape to a certain character. For example, the initial selection device 702 may utilize an image sample of the character and search in the character set the characters having high similarities of shape to the image sample, as the characters having high similarities of shape to the character so as to form the similar character list of the character. For another example, the initial selection device 702 may utilize a plurality of image samples of the character to search the similar character list of the character. As particular examples, the initial selection device 702 may employ the method described above with reference to FIG. 2 or FIG. 3, the description of which is not repeated herein.

When searching for the similar character list of the character by using the method of FIG. 2 or FIG. 3, the initial selection device 702 may utilize any appropriate method of searching characters having high similarities of shape to the image sample. For example, the initial selection device 702 may utilize the method described above with reference to FIG. 4 or FIG. 5, the description of which is not repeated herein.

As an example, the number of characters in the similar character list may be not predefined, for example, a certain similarity threshold may be set and the characters whose similarities in shape to a character (e.g. the first character) are larger than the threshold may be selected as the elements in the similar character list of the first character. As another example, the number (e.g. represented by N, N≧1) of characters in the similar character list of a character may be predefined according to actual application scenarios, and the N characters whose similarities in shape to the first character are highest may be selected to form the similar character list of the first character.

The cluster forming device 704 is configured to select in the similar character lists output by the initial selection device 702 one or more of characters having high mutual similarity therebetween, as a character cluster.

The cluster forming device 704 may utilize any appropriate method to select in these similar character lists, so long as any two of the selected characters in the character cluster have high mutual similarity in shape therebetween.

As an example, the cluster forming device 704 may select in these similar character lists characters whose mutual similarity are no smaller than a certain threshold, that is, the mutual similarity between any two of the characters in the character cluster is no smaller than the threshold (The threshold may be determined according to actual application scenarios, and is not limited to any particular value).

As another example, the cluster forming device 704 may utilize the Maximum Clique-based graph model described above (e.g. the method described with reference to FIG. 6) to select in these similar character lists the characters having high mutual similarity. The description of the method is not repeated herein.

As a preferred example, one of any two of the characters in the character cluster may be included in the other's similar character list.

With the above apparatus 700, a character set may be divided into a plurality of character clusters. Any two characters in a character cluster have high mutual similarity therebetween, thereby assuring and improving the accuracy of the clustering. In addition, in the embodiments, it is not necessary to predetermine the number of character clusters, that is, it is not necessary to predefine how may clusters the character set is divided into. By using the character clusters thus formed, the accuracy and efficiency of the character recognition and processing may be improved.

It should be understood that the above embodiments and examples are illustrative, rather than exhaustive. The present disclosure should not be regarded as being limited to any particular embodiments or examples stated above.

In the above embodiments or examples, some expressions (e.g. "the first character", "the first threshold" and "the second threshold") contain the wording "first" or "second" or the like. It should be understood that such expressions are merely used to literally distinguish the terms from each other and should not be considered as a limitation to their order or any other limitation.

The components, units or steps in the above apparatuses and methods can be configured with software, hardware, firmware or any combination thereof, by using method or means well known in the art, the details of which are omitted herein.

Figure 8:
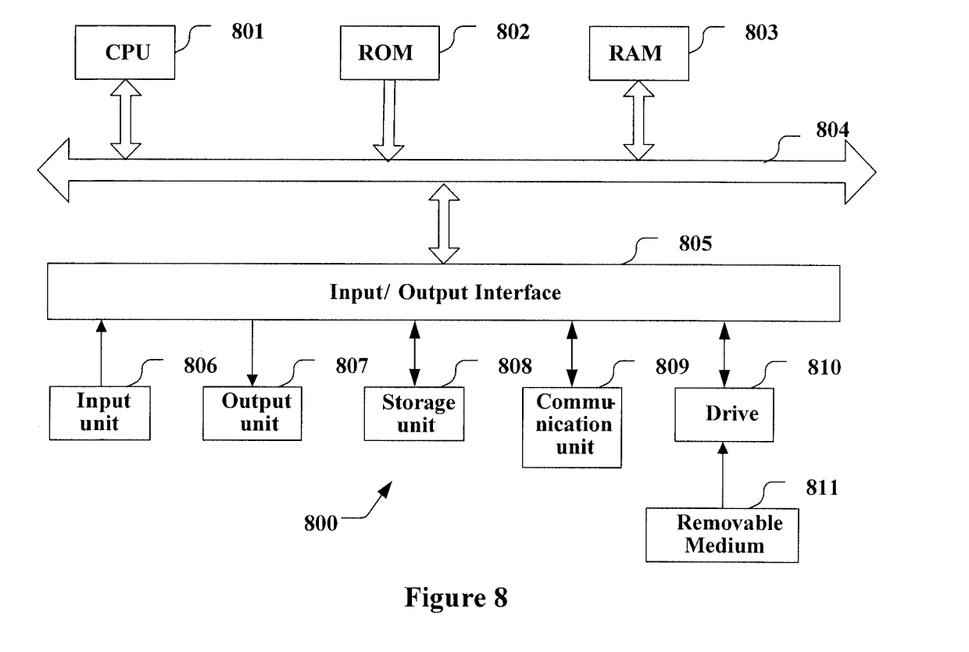
FIG. 8 is a schematic block diagram illustrating the structure of a computer for realizing the methods according to embodiments or examples of the disclosure.

As an example, in the case of using software or firmware, programs constituting the software for realizing the above method or apparatus can be installed to a computer with a specialized hardware structure (e.g. the general purposed computer as shown in FIG. 8) from a storage medium or a network. The computer, when installed with various programs, is capable of carrying out various functions.

In FIG. 8, a central processing unit (CPU) 801 executes various types of processing in accordance with programs stored in a read-only memory (ROM) 802, or programs loaded from a storage unit 808 into a random access memory (RAM) 803. The RAM 803 also stores the data required for the CPU 801 to execute various types of processing, as required. The CPU 801, the ROM 802, and the RAM 803 are connected to one another through a bus 804. The bus 804 also connects to an input/output interface 805.

The input/output interface 805 connects to an input unit 806 composed of a keyboard, a mouse, etc., an output unit 807 composed of a cathode ray tube or a liquid crystal display, a speaker, etc., the storage unit 808, which includes a hard disk, and a communication unit 809 composed of a modem, a terminal adapter, etc. The communication unit 809 performs communicating processing. A drive 810 is connected to the input/output interface 805, if needed. In the drive 810, for example, removable media 811 is loaded as a recording medium containing a program of the present invention. The program is read from the removable media 811 and is installed into the storage unit 808, as required.

In the case of using software to realize the above consecutive processing, the programs constituting the software may be installed from a network such as Internet or a storage medium such as the removable media 811.

Those skilled in the art should understand the storage medium is not limited to the removable media 811, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 802 or the hard disc involved in the storage unit 808, where the program is recorded and which are previously mounted on the main body of the device and delivered to the user.

The present disclosure further provides a program product having machine-readable instruction codes which, when being executed, may carry out the method for cross phase modulation recovery according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

As can be seen from the above description, the embodiments of the present disclosure provide at least the following solutions:

Note 1. A method for processing an image including a character, including:

searching in a set of characters one or more characters having highest similarities of shape to a character in the set of characters, hereinafter the character being referred to as a first character, the one or more searched characters forming a similar character list of the first character;

searching in the set of characters one or more characters having highest similarities of shape to each character in the similar character list of the first character, to form a similar character list of each character in the similar character list of the first character; and selecting in the similar character lists one or more characters having a high mutual similarity between each other, as a character cluster.

Note 2. The method according to Note 1, wherein searching in the set of characters one or more characters having highest similarities of shape to the first character comprises:

searching in the set of characters one or more characters having highest similarities of shape to each image sample of a plurality of image samples of the first character, as a candidate character set of the each image sample, so as to form a plurality of candidate character sets each of which corresponds to one of the image samples;

calculating a frequency of each character occurring in the plurality of candidate character sets; and selecting in the plurality of candidate character sets one or more characters corresponding to highest frequencies, to form the similar character list of the first character.

Note 3. The method according to Note 2, wherein searching in the set of characters one or more characters having highest similarities of shape to each image sample comprises:

recognizing each image sample by using a character recognizing engine, to obtain a recognition result for the each image sample, the recognition result including one or more characters similar to the each image sample in shape and similarity values of shape between the one or more characters and the each image sample; and selecting in the recognition result one or more characters corresponding to largest similarity values.

Note 4. The method according to Note 2 or 3, wherein selecting in the candidate character sets one or more characters corresponding to highest frequencies comprises:

selecting in the plurality of candidate character sets one or more characters corresponding to frequencies larger than a first threshold, to form the similar character list of the first character.

Note 5. The method according to Note 1 or 2, wherein one of any two characters of the character cluster is included in the other's similar character list.

Note 6. The method according to Note 2 or 3, wherein before calculating the frequency of each character occurring in the plurality of candidate character sets, the method further comprises:

removing from each character set one or more characters having similarities of shape to the first character lower than a second threshold.

Note 7. The method according to Note 4, wherein the first threshold is proportional to a frequency of a character corresponding to a second largest frequency in the plurality of candidate character sets.

Note 8. An apparatus for processing an image including a character, including:

an initial selection device, configured to search in a set of characters one or more characters having highest similarities of shape to a character in the set of characters, hereinafter the character being referred to as a first character, the one or more searched characters forming a similar character list of the first character, and further configured to search in the set of characters one or more characters having highest similarities of shape to each character in the similar character list of the first character, to form a similar character list of each character in the similar character list of the first character; and a cluster forming device, configured to select in the similar character lists one or more characters having a high mutual similarity between each other, as a character cluster.

Note 9. The apparatus according to Note 8, wherein the initial selection device is further configured to search in the set of characters one or more characters having highest similarities of shape to the first character by:

searching in the set of characters one or more characters having highest similarities of shape to each image sample of a plurality of image samples of the first character, as a candidate character set of the each image sample, so as to form a plurality of candidate character sets each of which corresponds to one of the image samples;

calculating a frequency of each character occurring in the plurality of candidate character sets; and selecting in the plurality of candidate character sets one or more characters corresponding to highest frequencies, to form the similar character list of the first character.

Note 10. The apparatus according to Note 9, wherein the initial selection device is further configured to search in the set of characters one or more characters having highest similarities of shape to each image sample by:

recognizing each image sample by using a character recognizing engine, to obtain a recognition result for the each image sample, the recognition result including one or more characters similar to the each image sample in shape and similarity values of shape between the one or more characters and the each image sample; and selecting in the recognition result one or more characters corresponding to largest similarity values.

Note 11. The apparatus according to Note 9 or 10, wherein the initial selection device is further configured to select in the candidate character sets one or more characters corresponding to highest frequencies by:

selecting in the plurality of candidate character sets one or more characters corresponding to frequencies larger than a first threshold, to form the similar character list of the first character.

Note 12. The apparatus according to Note 8 or 9, wherein one of any two characters of the character cluster is included in the other's similar character list.

Note 13. The apparatus according to Note 9 or 10, wherein the initial selection device is further configure to: remove from each character set one or more characters having similarities of shape to the first character lower than a second threshold, before calculating the frequency of each character occurring in the plurality of candidate character sets.

Note 14. The apparatus according to Note 11, wherein the first threshold is proportional to a frequency of a character corresponding to a second largest frequency in the plurality of candidate character sets.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. A method for processing an image including a character, comprising:

searching, by a processor, in a set of characters one or more characters having highest similarities of shape to a character in the set of characters, hereinafter the character being referred to as a first character, the one or more searched characters forming a similar character list of the first character;

searching, by the processor, in the set of characters one or more characters having highest similarities of shape to each character in the similar character list of the first character, to form a similar character list of each character in the similar character list of the first character; and selecting, by the processor, in the similar character lists one or more characters having a high mutual similarity between each other, as a character cluster.

2. The method according to claim 1, wherein searching in the set of characters one or more characters having highest similarities of shape to the first character comprises:

searching in the set of characters one or more characters having highest similarities of shape to each image sample of a plurality of image samples of the first character, as a candidate character set of the each image sample, so as to form a plurality of candidate character sets each of which corresponds to one of the image samples;

calculating a frequency of each character occurring in the plurality of candidate character sets; and selecting in the plurality of candidate character sets one or more characters corresponding to highest frequencies, to form the similar character list of the first character.

3. The method according to claim 2, wherein searching in the set of characters one or more characters having highest similarities of shape to each image sample comprises:

recognizing each image sample by using a character recognizing engine, to obtain a recognition result for the each image sample, the recognition result comprising one or more characters similar to the each image sample in shape and similarity values of shape between the one or more characters and the each image sample; and selecting in the recognition result one or more characters corresponding to largest similarity values.

4. The method according to claim 2, wherein selecting in the candidate character sets one or more characters corresponding to highest frequencies comprises:

selecting in the plurality of candidate character sets one or more characters corresponding to frequencies larger than a first threshold, to form the similar character list of the first character.

5. The method according to claim 1, wherein one of any two characters of the character cluster is included in the other's similar character list.

6. The method according to claim 2, wherein before calculating the frequency of each character occurring in the plurality of candidate character sets, the method further comprises:

removing from each character set one or more characters having similarities of shape to the first character lower than a second threshold.

7. The method according to claim 4, wherein the first threshold is proportional to a frequency of a character corresponding to a second largest frequency in the plurality of candidate character sets.

8. An apparatus for processing an image including a character, comprising:
- an initial selection device, configured to search in a set of characters one or more characters having highest similarities of shape to a character in the set of characters, hereinafter the character being referred to as a first character, the one or more searched characters forming a similar character list of the first character, and further configured to search in the set of characters one or more characters having highest similarities of shape to each character in the similar character list of the first character, to form a similar character list of each character in the similar character list of the first character; and
- a cluster forming device, configured to select in the similar character lists one or more characters having a high mutual similarity between each other, as a character cluster.

9. The apparatus according to claim 8, wherein the initial selection device is further configured to search in the set of characters one or more characters having highest similarities of shape to the first character by:
- searching in the set of characters one or more characters having highest similarities of shape to each image sample of a plurality of image samples of the first character, as a candidate character set of the each image sample, so as to form a plurality of candidate character sets each of which corresponds to one of the image samples;
- calculating a frequency of each character occurring in the plurality of candidate character sets; and
- selecting in the plurality of candidate character sets one or more characters corresponding to highest frequencies, to form the similar character list of the first character.

10. The apparatus according to claim 9, wherein the initial selection device is further configured to search in the set of characters one or more characters having highest similarities of shape to each image sample by:
- recognizing each image sample by using a character recognizing engine, to obtain a recognition result for the each image sample, the recognition result comprising one or more characters similar to the each image sample in shape and similarity values of shape between the one or more characters and the each image sample; and
- selecting in the recognition result one or more characters corresponding to largest similarity values.

11. The apparatus according to claim 9, wherein the initial selection device is further configured to select in the candidate character sets one or more characters corresponding to highest frequencies by:
- selecting in the plurality of candidate character sets one or more characters corresponding to frequencies larger than a first threshold, to form the similar character list of the first character.

12. The apparatus according to claim 8, wherein one of any two characters of the character cluster is included in the other's similar character list.

13. The apparatus according to claim 9, wherein the initial selection device is further configure to: remove from each character set one or more characters having similarities of shape to the first character lower than a second threshold, before calculating the frequency of each character occurring in the plurality of candidate character sets.

14. The apparatus according to claim 11, wherein the first threshold is proportional to a frequency of a character corresponding to a second largest frequency in the plurality of candidate character sets.

* * * * *